(12) United States Patent
Li et al.

(10) Patent No.: US 9,712,217 B2
(45) Date of Patent: Jul. 18, 2017

(54) PARALLEL CHANNEL TRAINING IN MULTI-USER MULTIPLE-INPUT AND MULTIPLE-OUTPUT SYSTEM

(71) Applicants: Qinghua Li, San Ramon, CA (US); Xiaogang Chen, Beijing (CN); Huaning Niu, Milpitas, CA (US); Robert Stacey, Portland, OR (US); Yuan Zhu, Beijing (CN); Xintian E. Lin, Mountain View, CA (US)

(72) Inventors: Qinghua Li, San Ramon, CA (US); Xiaogang Chen, Beijing (CN); Huaning Niu, Milpitas, CA (US); Robert Stacey, Portland, OR (US); Yuan Zhu, Beijing (CN); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 14/582,332

(22) Filed: Dec. 24, 2014

(65) Prior Publication Data

US 2016/0072564 A1 Mar. 10, 2016

Related U.S. Application Data

(60) Provisional application No. 62/047,475, filed on Sep. 8, 2014.

(51) Int. Cl.
*H04B 7/04* (2017.01)
*H04B 7/0452* (2017.01)
(Continued)

(52) U.S. Cl.
CPC ......... *H04B 7/0452* (2013.01); *G06N 99/005* (2013.01); *H04L 5/0025* (2013.01);
(Continued)

(58) Field of Classification Search
CPC .. H04B 7/0452; H04B 7/0626; H04B 7/0417; G06N 99/005; H04W 76/02
See application file for complete search history.

(56) References Cited

U.S. PATENT DOCUMENTS

2012/0026909 A1 2/2012 Seok
2012/0269124 A1 10/2012 Porat
(Continued)

FOREIGN PATENT DOCUMENTS

JP 2007318730 12/2007
TW 201105057 A 2/2011
(Continued)

OTHER PUBLICATIONS

International Search Report and Written Opinion for PCT Application No. PCT/US2015/044437 mailed Nov. 19, 2015.
(Continued)

*Primary Examiner* — Jackie Zuniga Abad
(74) *Attorney, Agent, or Firm* — Eversheds-Sutherland (US) LLP (57) ABSTRACT

This disclosure describes systems, and methods related to parallel channel training in communication networks. A first computing device comprising one or more processors and one or more transceiver component may receive a first connection request from a second computing device, and a second connection request from a third computing device. The first computing device may send the first training field to the second computing device based at least in part on the first connection request and sending in parallel, the second training field to the third computing device based at least in part on the second connection request. The first computing device may establish a first spatial channel stream with the second computing device based at least in part on the first training field and a second spatial channel stream with the
(Continued)

third computing device based at least in part on the second training field.

18 Claims, 6 Drawing Sheets

(51) Int. Cl.
    *G06N 99/00*     (2010.01)
    *H04L 5/00*     (2006.01)
    *H04L 27/26*     (2006.01)
    *H04W 72/00*     (2009.01)

(52) U.S. Cl.
    CPC ........ *H04L 5/0051* (2013.01); *H04L 27/2613* (2013.01); *H04W 72/00* (2013.01)

(56) References Cited

U.S. PATENT DOCUMENTS

2013/0301551 A1    11/2013    Ghosh et al.
2015/0009894 A1*    1/2015    Vermani ............... H04L 1/0072 370/328
2015/0030094 A1*    1/2015    Zhang ................. H04B 7/0456 375/267

FOREIGN PATENT DOCUMENTS

TW      201114208 A      4/2011
TW      201208313 A      2/2012
WO      2013085270      6/2013

OTHER PUBLICATIONS

Search Report for Taiwan Patent Application No. 104125651 dated Jun. 22, 2016 (3 pgs., including 2 pgs English correspondence).

* cited by examiner

PARALLEL CHANNEL TRAINING IN MULTI-USER MULTIPLE-INPUT AND MULTIPLE-OUTPUT SYSTEM

CROSS-REFERENCE TO RELATED APPLICATIONS

This application claims the benefit of U.S. Provisional Application No. 62/047,475, filed Sep. 8, 2014, the disclosure of which is incorporated herein by reference as if set forth in full.

TECHNICAL FIELD

This disclosure generally relates to systems and methods for wireless communications and, more particularly, to parallel channel training in a wireless communication network.

BACKGROUND

Wi-Fi network performance is an important factor in environments with high numbers of users, such as hotspots in public venues. Efficient use of available spectrum and better management of interferences in a Wi-Fi environment may improve Wi-Fi performance. In order to address the issue of increasing bandwidth requirements that are demanded for wireless communications systems, different schemes may be employed to allow multiple user devices to communicate with a single access point by sharing the channel resources while achieving high data throughputs. Multiple-input and multiple-output (MIMO) technology represents one such scheme that has emerged as a popular technique for the next generation communication systems. MIMO technology has been adopted in several emerging wireless communications standards such as the Institute of Electrical and Electronics Engineers (IEEE) 802.11 standard.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "communication devices", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

One or more example embodiments discussed herein relate to systems, methods, and devices for parallel channel training where channel training fields and symbols of different user device(s) may be sent simultaneously. Each training field may be comprised of one or more symbols. The present disclosure generally relates to Wi-Fi networks, including the family of IEEE 802.11 standards.

In one embodiment, a multi-user multiple-input multiple-output antenna system (MU-MIMO) may provide an enhancement for the IEEE 802.11 family of standards. With MU-MIMO, multiple user devices may be served at the same time by one or more access points. Some of the IEEE 802.11 standards (e.g., IEEE 802.11ax) may use orthogonal frequency division multiplexing access (OFDMA) to boost the amount of data an access point may transmit. Like OFDM (orthogonal frequency-division multiplexing), OFDMA encodes data on multiple sub-carrier frequencies—essentially packing more data into the same amount of air space. It is understood that OFDMA is a multi-user version of OFDM digital modulation scheme. Multiple access is achieved in OFDMA by assigning subsets of subcarriers to individual user devices, which may allow simultaneous data rate transmission from several user devices.

In one embodiment, after an access point establishes one or more data streams (also referred to communication streams or communication channels) with one or more user devices, the access point may communicate in a downlink direction using data packets. The downlink direction may be a direction of data transmitted from the access point to the user device. An uplink direction may be a direction of data transmitted from the user device back to the access point. The data packets may be preceded by one or more preambles that may be part of one or more headers. These preambles may be used to allow the user device on the network to detect a new incoming data packet from the access point. A preamble may be a signal used in network communications to synchronize transmission timing between two or more computing devices. The length of the preamble may affect the time it takes to transmit data, which in turn may increase the data packet overhead.

In one embodiment, channel or stream training may be used to allow a receiving user device to properly synchronize with the transmitting device, e.g., an access point. For example, in the downlink direction, the access point may transmit one or more channel training symbols in one or more channel training fields to train the user device to properly communicate with each other. The channel training is established by using one or more training fields in the preamble that may precede the data packets sent from the transmitter, e.g., the access point. The number of training symbols included may affect the time it takes to train a channel based at least in part on the number of channels to be established with a user device. For example, in IEEE 802.11 ax, the use of OFDM symbols to represent data between computing devices may have an increased OFDM symbol duration, which in turn may be taxing on the time it takes to train a channel, and therefore, increase the overhead. This is especially true for small and medium packets because, for example, an access point may invest a similar amount of the overhead regardless of the size of the packet. As an example, if an access point serves eight user devices with a single communication stream for each user device, it may take the duration of eight channel training symbols to train the eight user devices. It is understood that the above is only an example, and other impact on the overhead may result due to the additional training of data streams.

In one embodiment, a mechanism for reducing the channel training overhead for a MU-MIMO system may be achieved by modifying the way the training symbols are transmitted from a transmitting device to a receiving device. For example, training symbols may be sent to one or more user devices simultaneously, such that the signals do not interfere with each other. This may result in the reduction of the channel training overhead by up to the number of user devices and/or the number of communication channels or training symbols (e.g., up to eight times in the case of IEEE 802.11ax). For example, if an access point serves eight user devices, having a single data stream for each user devices, sending the channel training symbols to each user device simultaneously may reduce the overhead by up to eight times since it may be possible to send the channel training symbols within one time duration. However, if one or more user devices request more than one channel, the training symbols may require additional symbols.

In one embodiment, in the downlink direction of an MU-MIMO system (DL MU-MIMO), the access point may obtain channel state information (CSI) feedback from the one or more user devices. Utilizing the CSI, the access point may mitigate interferences (e.g., crosstalk) among different user devices' signals. Therefore, ideally each user device should only receive their own signal in DL MU-MIMO. In other words, the access point may create isolated spatial channels to send signals to different user devices.

In one embodiment, the CSI may be used to communicate the properties of a communication link. For example, the access point and the user device(s) may utilize the CSI information to determine the signal propagation between them. Consequently, it may be possible to send the channel training signals of all users simultaneously (or on the same frequency-time resource) over the spatial channels instead of taking orthogonal resources in the frequency-time domain because the signals may not interfere with each other due to the use of the CSI information. This may reduce the channel training overhead by a factor up to eight. It is understood that in wireless communications, CSI refers to known channel properties of a communication link. This information may describe how a signal propagates from the transmitter to the receiver, and represents the combined effect of, for example, scattering, fading, and power decay with distance. The CSI may make it possible to adapt transmissions to current channel conditions, which may be important for achieving reliable communication with high data rates in multi-antenna systems (e.g., in MU-MIMO systems). In some embodiments, crosstalk between different communications channels may be mitigated by transmitting additional training fields.

The term beamforming or spatial filtering of spatial channels is a signal processing technique used in sensor arrays for directional signal transmission or reception. Beamforming may be used at both the transmitting and receiving ends in order to achieve spatial selectivity. Spatial selectivity is the selection of multipath waves arriving at a receiving computing device from different directions. It is understood that beamforming may be used for radio or sound waves. Beamforming may be found in applications such as radar, sonar, seismology, wireless communications, radio astronomy, acoustics, and biomedicine.

Figures 1, 1B:
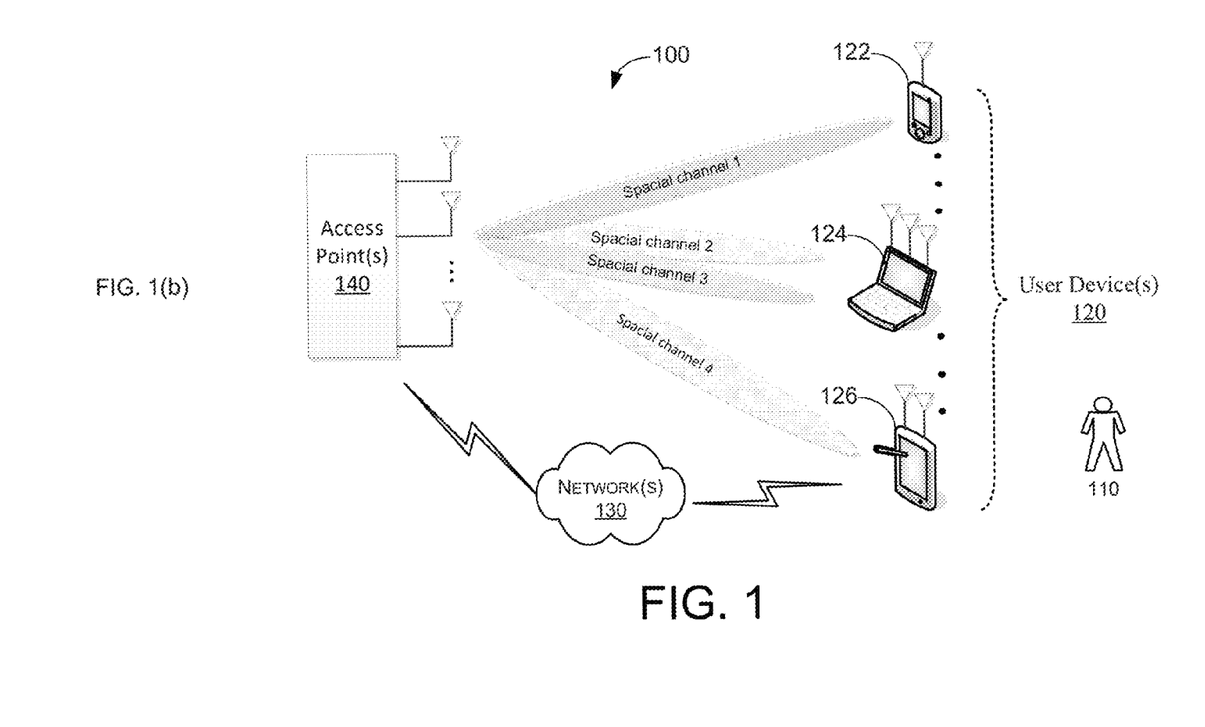
FIG. 1(b) depicts an illustrative example of schematic diagram of components of an illustrative parallel channel training system, according to one or more example embodiments of the present disclosure.
Figure 1A:
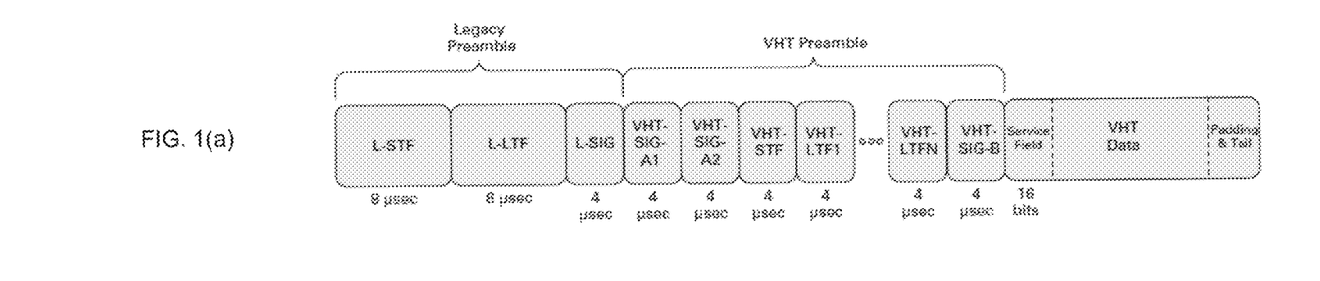
FIG. 1(a) depicts a downlink packet format for a wireless communication network.

FIG. 1(a) depicts an illustrative downlink packet format following one of the IEEE standards, (e.g., IEEE 802.11 ac). Since training symbol of each stream occupies an orthogonal or distinct resource in frequency-time domain, the overhead linearly increases with the number of streams. For example, if an access point serves eight user devices with a single communication stream for each user device, it may take the duration of eight channel training symbols to train the eight user devices. In that case, it may take up to 128 µs for 8 streams. This overhead size may be taxing on small or medium packet. Typically, the downlink data packet of an IEEE 802.11a/g system as shown in FIG. 1(a) may contain a legacy preamble that may be compatible with legacy standards, such as 802.11a/g. The downlink data packet may also contain a very high throughput (VHT) preamble including a number of timeslots with certain time duration and that may contain various fields that may follow one or more IEEE standards (e.g., 802.11 ac). As shown in FIG. 1(a), under the VHT preamble of a packet format in IEEE 802.11ac, there are a number of VHT long training field symbols (VHT-LTF$_1$ ... VHT-LTF$_N$), where N=1, 2, ..., 8, that may be used for channel training. Each of the training symbols may have a duration of about 4 µs. Each data stream may be associated with a sequence of training symbols. Further, the training symbols of each data stream (also referred to as a channel) are sent over orthogonal resources, separable in time, frequency, and/or code sequence domains, may be utilized to achieve the orthogonality between the training symbol sequences. Generally, a P matrix is a complex square matrix with every principle minor>0. A minor of a matrix A is generally a determinant of some smaller square matrix, cut down from A by removing one or more of its rows or columns. Minors obtained by removing just one row and one column from square matrices (first minors) are required for calculating matrix cofactors, which in turn are useful for computing both the determinant and inverse of square matrices. An orthogonal matrix such as the P matrix may be applied to the training symbols for a given group of user devices, which may result in training symbols being separated and more easily distinguishable from one to another. An orthogonal matrix such as the sub-matrix of the P matrix of IEEE 802.11ac, whose size is M elements by N elements, where M≤N, may be selected. For example, interferences between the symbols may be mitigated by utilizing the orthogonality feature of the training symbol sequences that have been converted using a P matrix.

FIG. 1(b) depicts an illustrative schematic diagram of components of an illustrative parallel training system 100 in accordance with one or more embodiments of the disclosure. A parallel training system 100 may reduce the channel training overhead by a factor up to eight. For example, the illustrative parallel training system 100 may comprise one or more user devices (e.g., user device(s) 120), one or more networks (e.g., networks 130), and one or more access points (e.g., access point(s) 140). The one or more illustrative user device(s) 120 may be operable by one or more users (e.g., user(s) 110), as depicted in FIG. 1(*b*). The user device(s) 120 (e.g., user devices 122, 124, and 126) may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

In the example of FIG. 1(*b*), three user devices (e.g., user devices 122, 124 and 126) may be scheduled to transmit and receive data in a frequency band (e.g., 20 MHz band). Utilizing the IEEE 802.11ax standard as an example, the user device 126 may be served in a frequency sub-band different from that used for user device 122 and user device 124. The user device 122 and the user device 124 may be served in the same frequency sub-band by the access point 140 in the downlink direction. Assuming in this example that user device 122 establishes one data stream (e.g., spatial channel 1) between it and the access point 140, the user device 124 establishes two data streams (e.g., shown as spatial channels 2 and 3) between it and the access point 140, and the user device 126 establishes one data stream (e.g., spatial channel 4) between it and the access point 140. Using the CSI of the user devices (e.g., user devices 122, 124 and 126), the access point 140 may form four data streams (in the form of spatial channels), one for the user device 122, two for the user device 124 and one for the user device 126.

In some embodiments, parallel training system 100 may train the four spatial channels in parallel by simultaneously transmitting the channel training fields in order to minimize the time delay for sending these four channel training fields sequentially, that is, one after the other, which may remove crosstalk between the user devices 122, 124 and 126.

Any of the user device(s) 120 (e.g., user devices 122, 124, and 126) and access point(s) 140 may be configured to communicate with each other and any other component of the parallel training system 100 via one or more communications networks (e.g., networks 130). Any of the communications networks may include, but are not limited to, any one or a combination of different types of suitable communications networks such as, for example, broadcasting networks, cable networks, public networks (e.g., the Internet), private networks, wireless networks, cellular networks, or any other suitable private and/or public networks. Further, any of the communications networks (e.g., network(s) 130) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., network(s) 130) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The user device(s) 120 may communicate with one or more access point(s) 140. The access point(s) 140 may be configured to provide access to one or more wireless networks. The access point(s) 140 may provide wireless signal coverage for a predefined area. The user device 120 may communicate with the access point(s) 140 wirelessly or through one or more network(s) 130. The access point(s) 140 may be a wireless access point, a router, a server, another mobile device, or any device that may wirelessly communicate with the user device 120 to provide the user device 120 access to a network, such as the Internet.

Any of user device(s) 120 and access point(s) 140 may include one or more respective communications antennae. Communications antenna may be any suitable type of antenna corresponding to the communications protocols used by the user device(s) 120 and access point(s) 140. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from the user devices(s) 120. Any of the user device(s) (e.g., user device(s) 120 and 150) and access point(s) 140, may include any suitable radio and/or transceiver for transmitting and/or receiving radio frequency (RF) signals in the bandwidth and/or channels corresponding to the communications protocols utilized by any of the user device(s) 120 and access point(s) 140 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, and 802.11ax), 5 GHz channels (e.g. 802.11n, 802.11ac, and 802.11ax), or 60 GHZ channels (e.g. 802.11ad) or any other 802.11 type channels (e.g., 802.11ax). In some embodiments, non-Wi-Fi protocols may be used for communications between devices, such as Bluetooth, dedicated short-range communication (DSRC), Ultra-High Frequency (UHF), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
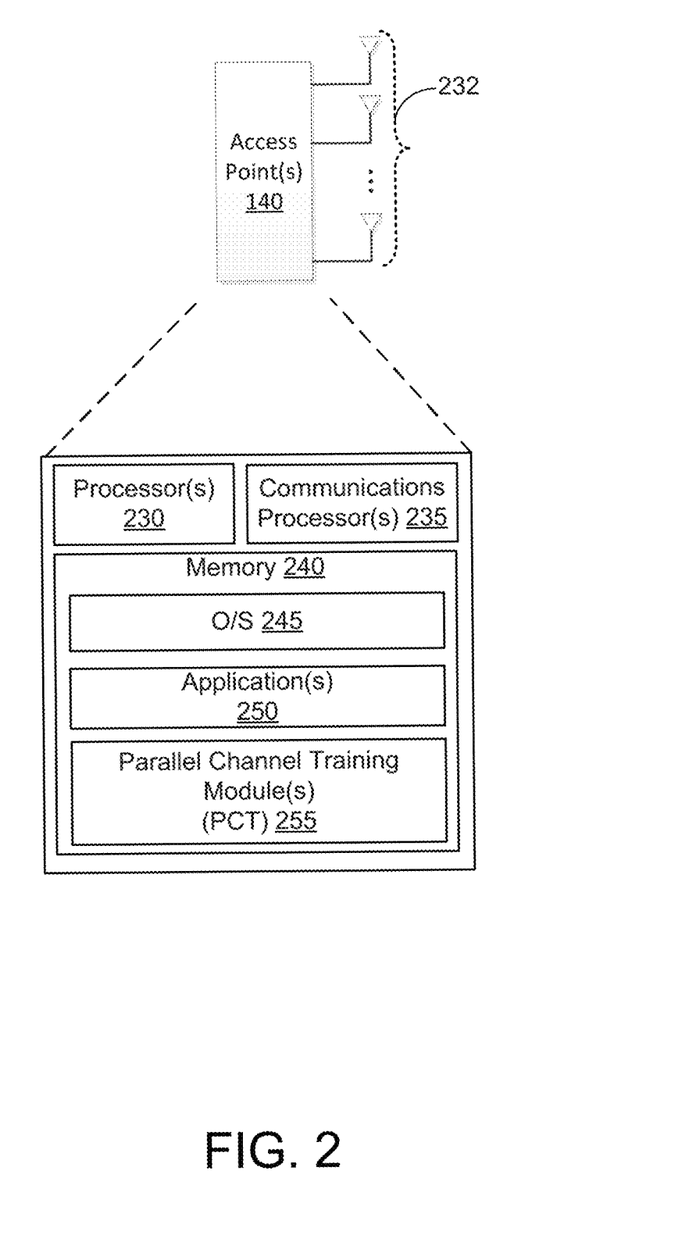
FIG. 2 depicts a schematic block diagram including various hardware and software components of the illustrative parallel channel training system, according to one or more example embodiments of the present disclosure.

FIG. 2 depicts the access point(s) 140, which may include one or more processors 230, one or more communications processors 235, one or more antennas 232, and/or one or more memories 240. Although FIG. 2 depicts the access point(s) 140, similar hardware, software and modules may be envisioned for the user device(s) 120. That is, the user device(s) 120 may also include one or more processors, one or more communications processors, one or more antennas, and/or one or more memories. Further, the user device(s) 120 may include one or more modules that may send/process channel-training fields, exchange CSI information in order to establish proper spatial channels and to synchronize with the access point(s) 140.

As depicted herein, the processors 230 may be configured to operate instructions, applications, and/or software associated with services provided by the access point(s) 140. These instructions, applications, and/or software may be stored on the memory 240, depicted as one or more operating systems (O/S) 245 and/or one or more applications 250, and may be retrievable and executable by the processors 230. Alternatively, the instructions, applications, and/or software executed by the processors 230 may be stored in any suitable location, such as the cloud or other remote locations. The instructions, applications, and/or software modules, such as O/S 245 and/or application 250 may or may not correspond to physical locations and/or addresses in the memory 240. In other words, the contents of each of the modules may not be segregated from each other and may be in fact stored in at least partially interleaved positions on the memory 240.

The processor(s) 230 may include, without limitation, a central processing unit (CPU), a digital signal processor (DSP), a reduced instruction set computer (RISC), a complex instruction set computer (CISC), or any combination thereof. The access point(s) 140 may also include a chipset (not shown) for controlling communications between the processor(s) 230 and one or more of the other components of the access point(s) 140. In one embodiment, the access point(s) 140 may be based on an Intel® Architecture system, and the processor(s) 230 and the chipset may be from a family of Intel® processors and chipsets, such as the Intel® Atom® processor family. The processor(s) 230 may also include one or more processors as part of one or more application-specific integrated circuits (ASICs) or application-specific standard products (ASSPs) for handling specific data processing functions or tasks.

The one or more antennas 232 may be any suitable antenna for wireless communications. In some cases, the one or more antennas 232 may be integrated with one of the communications processors 235, the processors 230, or any other elements of the access point(s) 140. The one or more antennas 232 may be any suitable type of antenna corresponding to the communications protocols used by the access point(s) 140. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

The communications processor(s) 235 may be configured to communicate with the processors 230 or other elements of the access point(s) 140 to transmit and/or receive communications signals via any suitable communications mechanism, link, channel, or standard. The communications processor 235 may be configured to receive a communications signal and appropriately modulate, or otherwise transform the signal, and then provide the signal to the antenna 232 for transmission via wireless channels, such as Wi-Fi. The communications processors 235 may further be configured to receive communications signals from the antenna 232 and demodulate, or otherwise transform, the received signals, and then provide the transformed signals to the processors 230 for further processing and/or storage. In certain aspects, the communications processors 235 may enable communications using a variety of modulation schemes, standards, and channels. In some cases, the communications processors 235 may be a separate element from the processors 230 and, in other cases, the communications processors 235 may be integrated with the processors 230.

The memory 240 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The O/S 245 may be configured to enable the operation of the one or more application(s) 250 and/or the parallel channel training module(s) ("PCT") 255 on the processor(s) 230 and/or communication processor(s) 1235. In one aspect, the O/S 245 may provide a common interface for the application 250 to interface with, utilize, and/or control the various hardware elements of an access point(s) 140. The details of operating systems are well known and will not be discussed in significant detail herein. Example operating systems may include, but are not limited to, Google® Android®, Apple® iOS®, Microsoft® Windows Mobile®, Microsoft® Windows 7®, or the like.

The O/S 245 may be configured to enable the operation of the PCT 255 on the processors 230 and/or communications processors 235 of the access point(s) 140.

The PCT 255 may receive one or more connection request from a user device 120 for establishing one or more spatial channels/streams between the access point 140 and the user device 120.

The PCT 255 may train a spatial channel between a transmitter (e.g., access points 140) and a receiver of the data packets (e.g., user device(s) 120) to allow the receiver to properly synchronize with the transmitter. For example, the access points 140 may send one or more channel training fields in the one or more preambles in the downlink direction. The channel training fields may allow the receiver of the data packets (e.g., user device(s) 120) to learn about the channel that may be established between the transmitter and the receiver.

The PCT 255 may reduce the number of timeslots used during the transmission of training fields to one or more user device(s) 120. As explained above, typically channel training fields are transmitted sequentially between a transmitter (e.g., access points 140), and a receiver (e.g., the user device(s) 120) (see, e.g., FIG. 1(a)). That is, the channel training signals of each data stream may be sent over orthogonal resources separable in time, frequency, and code sequence domains. For example, if the access point 140 serves 8 users with a single data stream each, it may take the duration of eight channel-training symbols. However, PCT 255 may transmit the one or more channel training fields simultaneously. Hence, PCT 255 may require a duration as little as the duration of one channel training symbol, based at least in part on the number of data streams per user.

In some embodiments, the PCT 255 may, transmit in the one or more preambles one or more control channel (CCH) fields together with one or more training fields (e.g., high efficiency training field (HE-LTF), etc.) in frequency division multiplexing (FDM) and/or code division multiplexing (CDM) or time division multiplexing (TDM) fashion. The CCH field may be utilized because it may be reliably decoded, and therefore, may provide additional training opportunity if combined with the one or more of the training fields (e.g., HE-LTF). The CCH may carry header information such as the L-SIG of the PHY preamble for the various standards (e.g., IEEE 802.11a, IEEE 802.11n, IEEE 802.11ac, etc.) and control information such as acknowledgment (ACK) to control messages. HE-LTF is a long training field comprising up to eight OFDM training symbols. In one example, the PCT 255 may choose odd sub carriers to carry the one or more CCH fields and choose the even subcarriers to carry the HE-LTF fields.

In one embodiment, the PCT 255 may remove the crosstalk among the user device(s) 120 that may have channels established on the same frequency subband (e.g., user devices 122 and 124). Removing the crosstalk may result in each of the user device(s) 120 (e.g., user devices 122 and 124) to only see signals intended for it. For example, in the downlink direction of MU-MIMO, the interferences among different signals of the user devices 122 and 124 may be mitigated by the access point(s) 140 using the CSI information. For example, the access point(s) 140 may conduct pre-cancellation in the downlink beamforming to remove the crosstalk among the user device(s) 120 such that each user device (e.g., user devices 122 and 124) may only see their own signals.

Although the PCT 255 may remove the crosstalk among the user devices' spatial channels, there may still be some residual crosstalk. The PCT 255 may remove the residual crosstalk that may persist based on various factors, for example, caused by an unreliable CSI, network conditions, and interferences. For example, if one of the user device(s) 120 has a few more antennas than the number of receiving data streams and the residual crosstalk is not negligible, the user device(s) 120 may use the additional antennas for mitigating the residual crosstalk. This may require the user device(s) 120 to estimate the statistics of the residual crosstalk, for example, using covariance matrix. It is understood that a covariance matrix is a matrix, used in probability and statistics theories, whose element in the i, j position of the matrix is the covariance between the $i^{th}$ and $j^{th}$ elements. For this purpose, the training signals sent simultaneously may be different for different users. If they are the same, the user may not be able to estimate the crosstalk. For example, the access points 140 may send different HE-LTF symbols for different users; or the access points 140 may send CCH fields that are on different subcarriers for different users.

In some embodiments, the PCT 255 may transmit an additional field to account for the residual crosstalk. For example, a high-efficiency multi-user training field (e.g., HE-MTF) may be used to transmit channel-training signals from the transmitter (e.g., the access points 140) to the receiver (e.g., user device(s) 120). The additional field may account for the residual crosstalk by sending the additional training signals.

In some embodiments, the HE-MTF field may include training signals of M streams into N symbol in frequency division multiplexing (FDM) fashion, where M>N (e.g., M=2 and N=1). The transmitter, such as the access point 140, may indicate the subcarrier locations of each stream. The subcarrier indication may be in the high efficiency signal field, for example, HE-SIGA preceding the HE-MTF field. During reception, the user device(s) 120 may know where the desired signal and interference signal are located in the HE-MTF field from the physical layer header e.g. HE-SIGA or the control channel CCH. Frequency domain interpolation may be used to obtain the interference statistics (e.g., covariance matrix for each subcarrier in the allocated subband). After the interference statistics are obtained, interference mitigation techniques such as minimum mean square error (MMSE) filter may be used for mitigating the residual crosstalk. It is understood that MMSE estimator is an estimation method, which minimizes the mean square error (MSE) of the fitted values of a dependent variable, which is a common measure of estimator quality.

Figure 3:
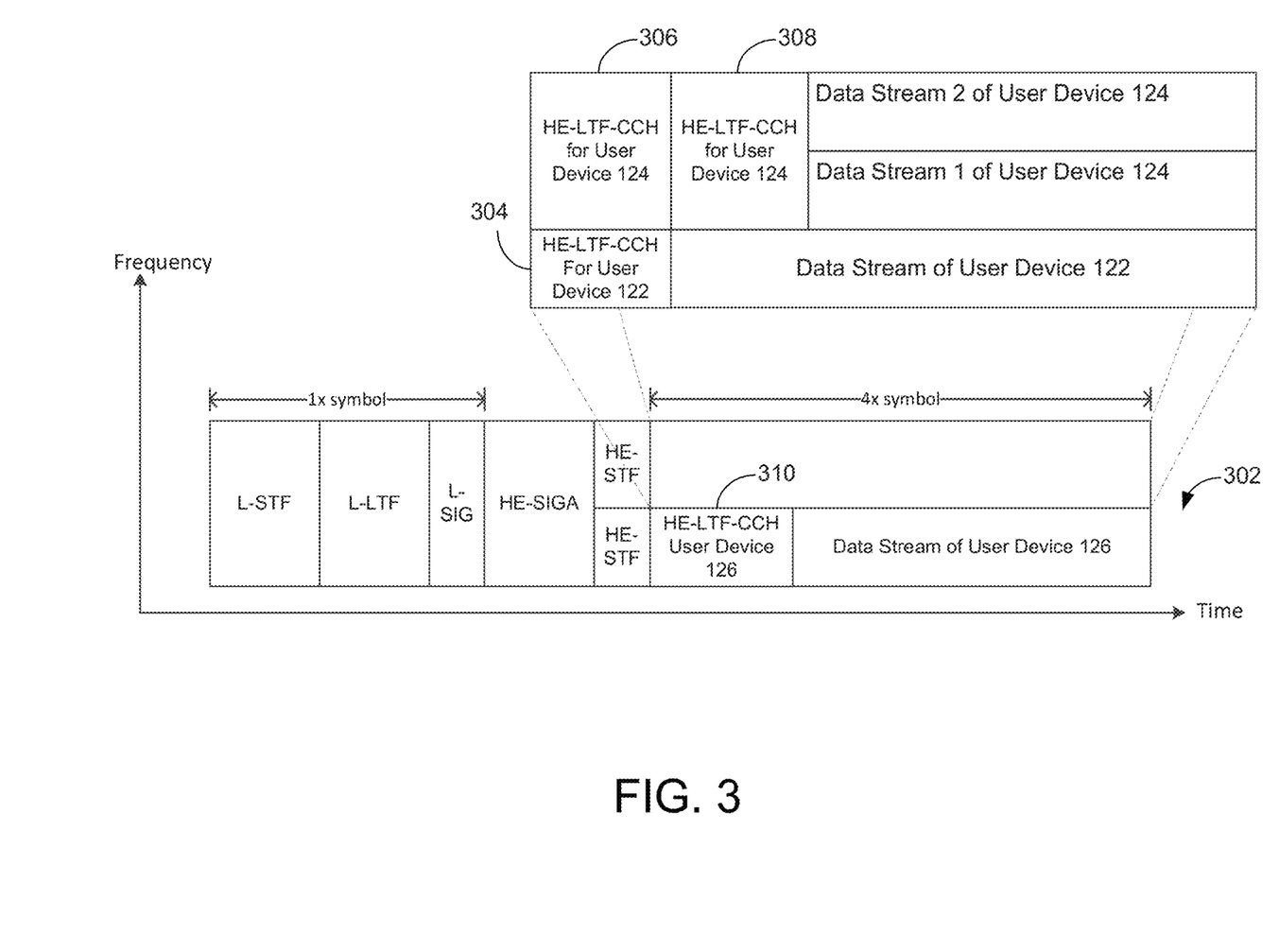
FIG. 3 depicts a an illustrative header including one or more preambles in accordance with certain example embodiments of the disclosure.

FIG. 3 provides an example embodiment of a preamble 302 that may be sent in the downlink direction of a wireless connection between the access point(s) 140 and at least one of the user device(s) 120, in accordance with one or more embodiments of the disclosure. FIG. 3 shows a preamble 302 that may be communicated to three devices (e.g., 122, 124 and 126) with one or more training fields parallel to each other in order to reduce the impact on the preamble overhead. For example, three user devices 122, 124 and 126 may each have one or more spatial channels established with the access point(s) 140. In this example, user device 126 is served in a frequency sub-band different from that of user devices 122 and 124. In addition, the user device 122 and the user device 124 may be served in the same frequency sub-band by the access point 140 in the downlink direction. Assume, solely for the purpose of this example, that user device 122 establishes one data stream between it and the access point 140, the user device 124 establishes two data streams between it and the access point 140, and the user device 126 establishes one data stream between it and the access point 140. Accordingly, the access point(s) 140 may form four spatial channels, one for the user device 122, two for the user device 124 and one for the user device 126.

As may be seen in FIG. 3, the preamble 302 may contain various fields, such as the high efficiency short training field (HE-STF), high efficiency long training field (HE-LTF), control channel (CCH) and others. One or more of these fields may be defined in one or more wireless standards, such as the IEEE 802.11 family of standards. The HE-STF field denotes high efficiency short training field, which may enable a receiving user device 120 to set the automatic gain control to a suitable gain level for the subsequent signals that may be beamformed. Beamforming may be used at both the transmitting and receiving side of communication sessions in order to achieve spatial selectivity. Spatial selectivity is the selection of multipath waves arriving at a receiving user device from different directions.

In one embodiment, one or more CCH fields may be sent together with one or more training fields (e.g., HE-LTF) in frequency division multiplexing OFDM, CDM, and/or TDM as shown in references, 304, 306, 308 and 310. The CCH field may be utilized in a decision feedback fashion because it may be reliably decoded, and therefore, may provide additional training opportunity if combined with one or more of the training fields (e.g., HE-LTF). Decision feedback and data aided (or assisted) channel estimation may mean the same thing. The data symbols are demodulated and detected or decoded first. If the detection or decoding of the data symbols is reliable enough, e.g., passing a CRC check, then the receiver may assume the data symbols transmitted by the transmitter are the same as the detected or decoded ones with a high probability. In this case, the receiver can use the detected or decoded data symbols as channel training symbols for estimating the channel response (or distortion effect) because it knows what has been sent and what has been received, (which is corrupted by the channel). For example, training field 304 may be utilized to train the data stream for user device 122, training fields 306 and 308 may be utilized to train the two data streams (data stream 1 and data stream 2) for the user device 124, and training field 310 may be utilized to train the data stream for the user device 126. Although the training field 306 and 308 are depicted as being the same, in other embodiment, the training fields 306 and 308 may have different content and/or symbols. In one example embodiment, odd subcarriers may carry the one or more CCH fields and even subcarriers may carry the HE-LTF signals/symbols. The CCH field may be treated as an additional channel-training signal for refining the channel estimation. Therefore, the symbol carrying the HE-LTF and the CCH may be treated as a full training symbol (e.g., HE-LTF-CCH 304, 306, 308, 310). For example, the preamble 302 may contain training fields HE-LTF and CCH to train the four spatial channels of user devices 122, 124 and 126. The user device 126 may utilize its HE-LTF and the CCH field (e.g., 310) for channel training associated with the spatial channel that may be established between the access point(s) 140 and the user device 126. Similarly, the user devices 122 and 124 may also receive their respective training fields (e.g., HE-LTF-CCH 304, 306 and 308) to train their respective spatial channels.

Since in the example of FIG. 3, the user device 126 is at a different frequency sub-band, its training signal 310 within the subband may not cause interference to the training of user device 122 and the user device 124. Therefore, the training signal 310 of user device 126 may be sent in parallel with the training signals of the user device 124 and the user device 122. Since the crosstalk between the spatial channels of the user device 122 and that of the user device 124 may have been already removed, partially or completely, by the access point(s) 140 using beamforming techniques such as zero-forcing beamforming or MMSE beamforming, the signal of the user device 122 and the signals of the user device 124 may be sent in parallel. The first channel training symbol (e.g., 306) of the user device 124 may be then sent in parallel with the training symbol of user device 122 (e.g., 306). However, since the user device 124 has two data streams associated with spatial channel 2 and spatial channel 3, it might not be sufficient to send each of the training fields (e.g., 306 and 308) for these two data streams in parallel due to interferences and crosstalk. Accordingly, the two training symbols used to train the two streams associated with spatial channel 2 and spatial channel 3 for user device 124 may be sent sequentially, as opposed to simultaneously. Therefore, in this scenario, the parallel channel training system may have reduced the timeslots used to train three user device(s) 120 (e.g., user devices 122, 124, and 126) from four timeslots to only two timeslots, which may in turn reduce the preamble overhead. In some embodiment, the two training symbols 306 and 308 may be further combined into one using frequency domain multiplexing (FDM). For example, the training signals of stream 2 and stream 3 use even and odd subcarriers, respectively.

Figure 4A:
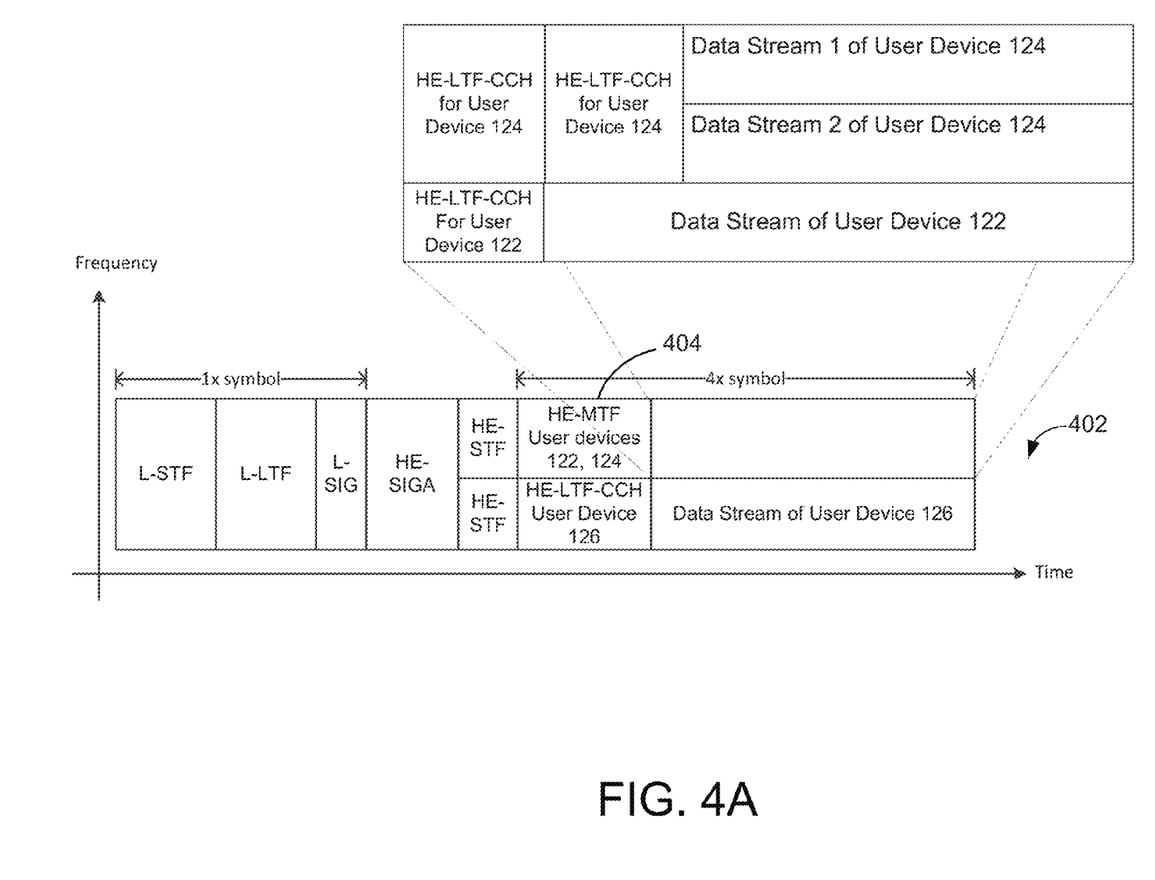
FIG. 4A depicts a an illustrative header including one or more preambles in accordance with certain example embodiments of the disclosure.

Referring to FIG. 4A, an example illustrative embodiment of a preamble 402 that may be sent in the downlink direction of a wireless connection between the access point(s) 140 and at one of the user device(s) 120 in accordance with one or more embodiments of the disclosure. FIG. 4A shows that in addition to transmitting the HE-LTF and the CCH in parallel, an new field may be used in order to enhance the channel stream training by removing crosstalk. For example, the user device 122 may establish one data stream with the access point 140, the user device 124 may establish two data streams with the access point 140, and the user device 126 may establish one data stream with the access point 140. The access point(s) 140 may remove the crosstalk among the user devices 122 and 124 since these two devices are served in the same frequency subband by the access point 140 in the downlink direction. Removing crosstalk between the user device 122 and 124 may enhance the ability of each of these user devices detecting the signals intended for it. However, as explained above, residual crosstalk may remain due to various factors, for example, an unreliable CSI, network conditions and interferences.

In one embodiment, if a user device has limited numbers of antennas, then the described mechanisms above may be sufficient to differentiate between the various spatial channels, even with the existence of residual crosstalk. However, in the scenarios where a user device has more antennas than data streams, and in the case where the residual crosstalk is not negligible compared to the typical interferences, such as noise, the user device may use the additional antennas for mitigating the residual crosstalk. This may require the user to estimate the statistics of the residual crosstalk, such as via a covariance matrix. As for this purpose, the training signals sent simultaneously, should be different for different users. If they are the same, then the user may not be able to estimate the crosstalk. In one embodiment, the access point(s) 140 may transmit an additional field to account for the residual crosstalk. For example, a high-efficiency multi-user training (HE-MTF) field 404 may be added to the preamble 402 to transmit channel-training signals from the transmitting device (e.g., the access points 140) to the receiving user devices (e.g., the user devices 122, 124). The additional HE-MTF field 404 may account for the residual crosstalk by sending additional training signals.

Figure 4B:
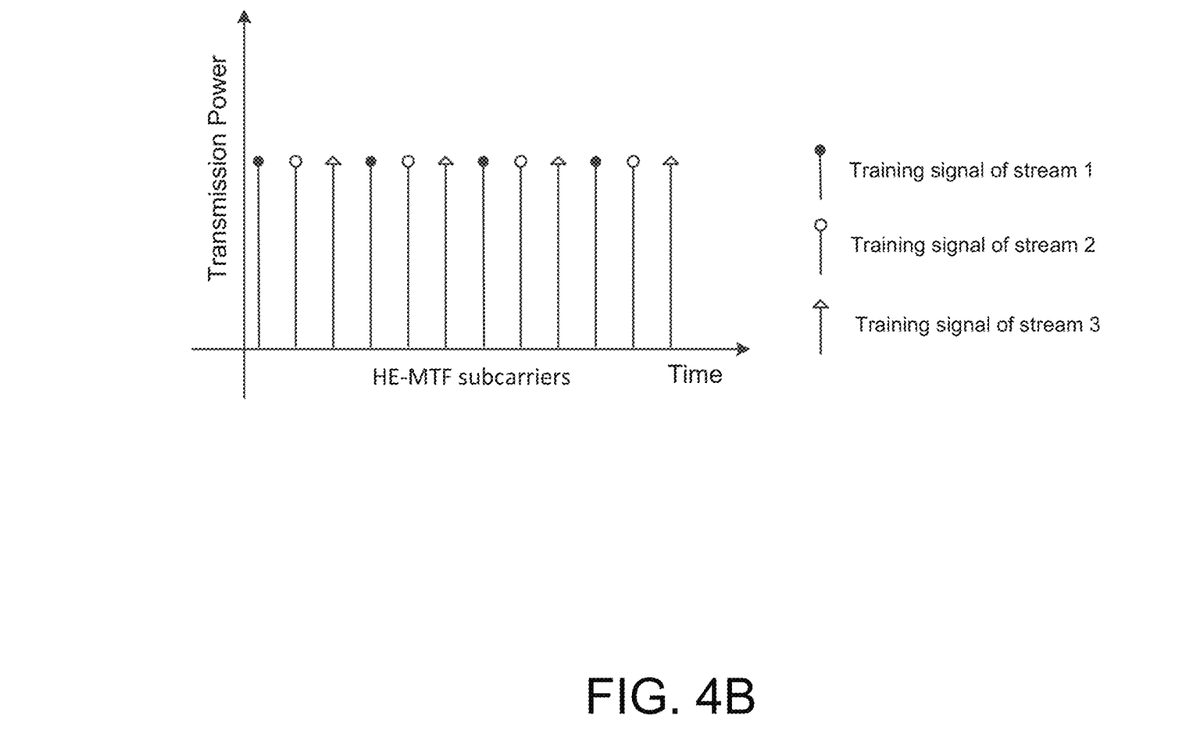
FIG. 4B depicts a flow diagram of an illustrative parallel channel training system in accordance with one or more embodiments of the disclosure.

Referring to FIG. 4B, an example illustrative embodiment of a channel training system in accordance to an embodiment of the disclosure.

In one embodiment, the additional HE-MTF field 404 may be added to the preamble 402, for example, to contain training signals of M streams that may be condensed into N symbol in FDM fashion, where M is the number of data streams and N is the number of symbols, also, where M>N (e.g., M=2 and N=1). Before sending the HE-MTF field, the access point may indicate the subcarrier locations of the training signals for each stream. During reception, the receiver of the HE-MTF field (e.g., user devices 122 and/or 124) may determine where the desired signal and interference signal are located in the MTF from the physical layer header (e.g., HE-SIGA or the control channel CCH). Frequency domain interpolation may be used to obtain the interference statistics e.g. covariance matrix for each subcarrier in the allocated subband. After the interference statistics are obtained, interference mitigation techniques such as MMSE receiver can be used for mitigating the residual crosstalk.

For example, if M=2 and N=1, every even subcarrier may carry the training signal for data stream 1, associated with spatial channel 1, and every odd subcarrier may carry the training signal for data stream 2, associated with spatial channel 1. As a second example (shown in FIG. 4B), if M=3 and N=1, subcarriers 1, 4, 7, . . . , 3n+1 may carry the training signals for data stream 1; subcarriers 2, 5, 8, . . . , 3n+2 may carry the training signals for data stream 2; and subcarriers 3, 6, 9, . . . , 3n+3 may carry the training signals for data stream 3. A third example, if M=8 and N=2, every $8^{th}$ subcarrier is for a stream in both symbol, e.g., subcarriers 1, 9, 17, for stream 1; subcarriers 2, 10, 18 for data stream 2, and so forth. It is understood that the above are only examples and other mechanisms using subcarriers to transmit training signals may be used.

Figure 5:
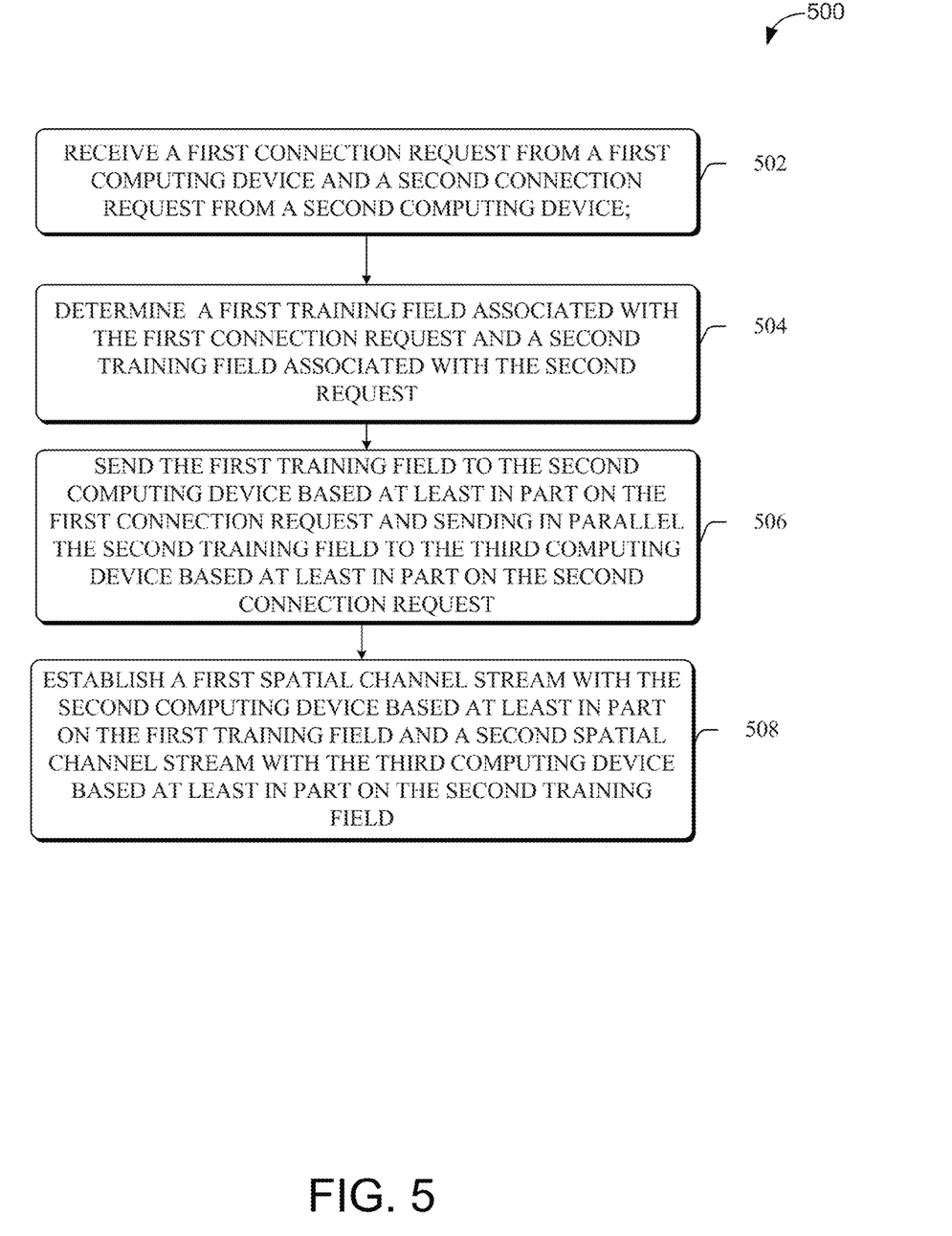
FIG. 5 depicts a flow diagram of an illustrative process for a channel training system in accordance with one or more embodiments of the disclosure.

FIG. 5 illustrates a flow diagram of illustrative process 500 for a channel training system in accordance with one or more embodiments of the disclosure.

At block 502, the PCT 255 may receive from one or more second devices (e.g., user device(s) 120) one or more connection requests, where the one or more devices may have one or more antennas in order to be able to utilize the functions of the MU-MIMO.

At block 504, PCT 255 may determine a first training field associated with the first connection request and a second training field associated with the second request. In the example of FIG. 1(*b*), the user devices 122 may have a data stream and user device 126 may have another data stream established with the access point(s) 140.

At block 506, PCT 255 may simultaneously (e.g., in parallel) transmit one or more channel training fields (e.g., HE-LTF) associated with the MU-MIMO downlink session, to the one or more second computing devices (e.g., user device(s) 120) based on the one or more connection requests. For example, PCT 255 may send one or more channel training fields in the one or more preambles in the downlink direction. The channel training fields may allow the receiver of the data packets (e.g., user device(s) 120) to learn about the channel that may be established between the transmitter and the receiver. Typically channel training fields are transmitted between a transmitter (e.g., access points 140), and a receiver (e.g., the user device(s) 120) sequentially (see, e.g., FIG. 1(*a*)). PCT 255 may transmit the one or more channel training fields simultaneously. In some embodiments, the PCT 255 may include the one or more training fields (e.g., HE-LTF), the one or more control channel fields (e.g., CCH) in one or more preambles (e.g., legacy and/or VHT preambles) sent from the first computing device (e.g., the access point(s) 140) to the one or more second computing devices (e.g., the user device(s) 120). PCT 255 may transmit the one or more channel training fields (e.g., HE-LTF) and the one or more control channels fields (CCH) simultaneously. However, if a user device has more than one data stream, it may be necessary to transmit the HE-LTF and the CCH sequentially.

In some embodiments, PCT 255 may, transmit in the one or more preambles and one or more CCH fields together with one or more HE-LTF in frequency division multiplexing (FDM) and/or code division multiplexing fashion. For example, PCT 255 may choose odd sub carriers to carry the one or more CCH fields and choose the even subcarriers to carry the HE-LTF fields. A rough channel estimate may be obtained from the HE-LTF for decoding the CCH. After the CCH is decoded, the CCH signal is treated as additional channel training signal for refining the channel estimation in return. Therefore, the symbol carrying the frequency-down-sampled HE-LTF and the robustly encoded CCH may be treated as a full training symbol.

For indoor scenarios, the frequency selectivity of channel is small. The channel training of M streams may be compressed into N symbols, where M>N. For example, instead of two HE-LTF symbols for user device 124, the two streams of user device 124 may share one HE-LTF symbol in an FDM fashion.

At block 508, the PCT 255 may establish a first spatial channel stream with the first computing device based at least in part on the first training field and a second spatial channel stream with the second computing device based at least in part on the second training field. For example, after training, the access point 140 may establish a data stream with the user device 122, two data streams with user device 124 and one data stream with user device 126.

In one embodiment, PCT 255 may transmit one or more multi-user training fields (e.g., HE-MTF) associated with the one or more channel training fields (e.g., HE-LTF). For example, PCT 255 may transmit this additional field to account for the residual crosstalk. For example, the HE-MTF field may be used to transmit channel-training signals from the transmitter (e.g., the access points 140) to the receiver (e.g., user device(s) 120). The HE-MTF field may account for the residual crosstalk by sending the additional training signals.

At block 508, PCT 255 may allocate one or more spatial channel streams (e.g., spatial channels 1-4 of the example of FIG. 1(*b*)) based at least in part on the channel training fields and the one or more multi-user training fields.

In example embodiments of the disclosure, there may be a method for wireless communication. The method may include receiving, by a first computing device including one or more processors and one or more transceiver components, a first connection request from a second computing device, and a second connection request from a third computing device. The method may include determining, by the first computing device, a first training field associated with the first connection request and a second training field associated with the second request. The method may include sending, by the first computing device, the first training field to the second computing device based at least in part on the first connection request and sending in parallel, the second training field to the third computing device based at least in part on the second connection request. The method may include establishing, by the first computing device, a first spatial channel stream with the second computing device based at least in part on the first training field and a second spatial channel stream with the third computing device based at least in part on the second training field. The first training field may include a first control channel (CCH) field and the second training field may include a second CCH field. The first CCH field and the second CCH may be sent on odd subcarriers and the first training field and the second training field may be sent on even subcarriers. The method may further include receiving a third connection request from the second computing device, determining a third training field associated with the third connection request, sending the third training field in sequence with the first training field to the second computing device, and establishing a second spatial channel stream with the second computing device. Establishing the first spatial channel stream may be based at least in part on a channel state information (CSI) associated with the second computing device. The first computing device may be an access point operating in multi-user multi-input and multi-output (MU-MIMO) wireless system. The first training field, the second training field and the third training field may be sent in a high efficiency throughput preamble.

According to example embodiments of the disclosure, there may be a computing device. The computing device may include a transceiver configured to transmit and receive wireless signals, an antenna coupled to the transceiver, one or more processors in communication with the transceiver, at least one memory that stores computer-executable instructions, and at least one processor of the one or more processors configured to access the at least one memory. The at least one processor of the one or more processors may be configured to execute the computer-executable instructions to receive a first connection request from a second computing device, and a second connection request from a third computing device. The at least one processor of the one or more processors may be configured to execute the computer-executable instructions to determine a first training field associated with the first connection request and a second training field associated with the second request. The at least one processor of the one or more processors may be configured to execute the computer-executable instructions to send the first training field to the second computing device based at least in part on the first connection request and sending in parallel, the second training field to the third computing device based at least in part on the second connection request. The at least one processor of the one or more processors may be configured to execute the computer-executable instructions to establish a first spatial channel stream with the second computing device based at least in part on the first training field and a second spatial channel stream with the third computing device based at least in part on the second training field. The first training field may include a first control channel (CCH) field and the second training field may include a second CCH field. The first CCH field and the second CCH may be sent on odd subcarriers and the first training field and the second training field may be sent on even subcarriers. The at least one processor of the one or more processors may be configured to execute the computer-executable instructions to receive a third connection request from the second computing device, determine a third training field associated with the third connection request, send the third training field in sequence with the first training field to the second computing device, and establish a second spatial channel stream with the second computing device. Establishing the first spatial channel stream may be based at least in part on a channel state information (CSI) associated with the second computing device. The first computing device may be an access point operating in multi-user multi-input and multi-output (MU-MIMO) wireless system. The first training field, the second training field and the third training field may be sent in a high efficiency throughput preamble.

In example embodiments of the disclosure, there may be a computer-readable medium storing computer-executable instructions which, when executed by a processor, cause the processor to perform operations. The operations may include receiving a first connection request from a second computing device, and a second connection request from a third computing device. The operations may include determining a first training field associated with the first connection request and a second training field associated with the second request. The operations may include sending the first training field to the second computing device based at least in part on the first connection request and sending in parallel, the second training field to the third computing device based at least in part on the second connection request. The operations may include establishing a first spatial channel stream with the second computing device based at least in part on the first training field and a second spatial channel stream with the third computing device based at least in part on the second training field. The first training field may include a first control channel (CCH) field and the second training field may include a second CCH field. The first CCH field and the second CCH may be sent on odd subcarriers and the first training field and the second training field may be sent on even subcarriers. The operations may further include receiving a third connection request from the second computing device, determining a third training field associated with the third connection request, sending the third training field in sequence with the first training field to the second computing device, and establishing a second spatial channel stream with the second computing device. Establishing the first spatial channel stream may be based at least in part on a channel state information (CSI) associated with the second computing device. The first computing device may be an access point operating in multi-user multi-input and multi-output (MU-MIMO) wireless system. The first training field, the second training field and the third training field may be sent in a high efficiency throughput preamble.

In example embodiments of the disclosure, there may be a wireless communication system. The system may include at least one memory that store computer-executable instructions, and at least one processor configured to access the at least one memory, wherein the at least one processor may be configured to execute the computer-executable instructions to receive a first connection request from a second computing device, and a second connection request from a third computing device. The at least one processor may be configured to execute the computer-executable instructions to determine a first training field associated with the first connection request and a second training field associated with the second request. The at least one processor may be configured to execute the computer-executable instructions to send the first training field to the second computing device based at least in part on the first connection request and sending in parallel, the second training field to the third computing device based at least in part on the second connection request. The at least one processor may be configured to execute the computer-executable instructions to establish a first spatial channel stream with the second computing device based at least in part on the first training field and a second spatial channel stream with the third computing device based at least in part on the second training field. The first training field may include a first control channel (CCH) field and the second training field may include a second CCH field. The first CCH field and the second CCH may be sent on odd subcarriers and the first training field and the second training field may be sent on even subcarriers. The at least one processor may be further configured to execute the computer-executable instructions to receive a third connection request from the second computing device, determine a third training field associated with the third connection request, send the third training field in sequence with the first training field to the second computing device, and establish a second spatial channel stream with the second computing device. Establishing the first spatial channel stream may be based at least in part on a channel state information (CSI) associated with the second computing device. The first computing device may be an access point operating in multi-user multi-input and multi-output (MU-MIMO) wireless system. The first training field, the second training field and the third training field may be sent in a high efficiency throughput preamble.

In example embodiments of the disclosure, there may be a wireless communication apparatus. The apparatus may include a means for receiving, by a first computing device including one or more processors and one or more transceiver components, a first connection request from a second computing device, and a second connection request from a third computing device. The apparatus may include a means for determining, by the first computing device, a first training field associated with the first connection request and a second training field associated with the second request. The apparatus may include a means for sending, by the first computing device, the first training field to the second computing device based at least in part on the first connection request and sending in parallel, the second training field to the third computing device based at least in part on the second connection request. The apparatus may include a means for establishing, by the first computing device, a first spatial channel stream with the second computing device based at least in part on the first training field and a second spatial channel stream with the third computing device based at least in part on the second training field. The first training field may include a first control channel (CCH) field and the second training field may include a second CCH field. The first CCH field and the second CCH may be sent on odd subcarriers and the first training field and the second training field may be sent on even subcarriers. The apparatus may further include a means for receiving a third connection request from the second computing device, a means for determining a third training field associated with the third connection request, a means for sending the third training field in sequence with the first training field to the second computing device, and a means for establishing a second spatial channel stream with the second computing device. A means for establishing the first spatial channel stream may be based at least in part on a channel state information (CSI) associated with the second computing device. The first computing device may be an access point operating in multi-user multi-input and multi-output (MU-MIMO) wireless system. The first training field, the second training field and the third training field may be sent in a high efficiency throughput preamble.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for training one or more communication channels in a wireless communication session comprising:
    receiving, by a first computing device comprising one or more processors and one or more transceiver components, a first connection request from a second computing device, and a second connection request from a third computing device;
    determining, by the first computing device, a first training field associated with the first connection request and a second training field associated with the second request, wherein the first training field includes a first control channel (CCH) field and the second training field includes a second CCH field;
    sending, by the first computing device, the first training field to the second computing device based at least in part on the first connection request and sending in parallel the second training field to the third computing device based at least in part on the second connection request; and
    establishing, by the first computing device, a first spatial channel stream with the second computing device based at least in part on the first training field and a second spatial channel stream with the third computing device based at least in part on the second training field.

2. The method of claim 1, wherein the first CCH field and the second CCH are sent on odd subcarriers and the first training field and the second training field are sent on even subcarriers.

3. The method of claim 1, further comprising:
receiving a third connection request from the second computing device;
determining a third training field associated with the third connection request;
sending the third training field in sequence with the first training field to the second computing device; and
establishing a third spatial channel stream with the second computing device.

4. The method of claim 3, wherein the first training field, the second training field and the third training field are sent in a high efficiency throughput preamble.

5. The method of claim 1, wherein establishing the first spatial channel stream is based at least in part on a channel state information (CSI) associated with the second computing device.

6. The method of claim 1, wherein the first computing device is an access point operating in multi-user multi-input and multi-output (MU-MIMO) wireless system.

7. An apparatus, comprising:
one or more processors;
at least one memory that stores computer-executable instructions; and
at least one processor of the one or more processors configured to access the at least one memory, wherein the at least one processor of the one or more processors is configured to execute the computer-executable instructions to:
receive a first connection request from a second computing device, and a second connection request from a third computing device;
determine a first training field associated with the first connection request and a second training field associated with the second request, wherein the first training field includes a first control channel (CCH) field and the second training field includes a second CCH field;
send the first training field to the second computing device based at least in part on the first connection request and sending in parallel, the second training field to the third computing device based at least in part on the second connection request; and
establish a first spatial channel stream with the second computing device based at least in part on the first training field and a second spatial channel stream with the third computing device based at least in part on the second training field.

8. The apparatus of claim 7, wherein the first CCH field and the second CCH are sent on odd subcarriers and the first training field and the second training field are sent on even subcarriers.

9. The apparatus of claim 7, further comprising:
receiving a third connection request from the second computing device;
determining a third training field associated with the third connection request;
sending the third training field in sequence with the first training field to the second computing device; and
establishing a third spatial channel stream with the second computing device.

10. The apparatus of claim 9, wherein the first training field, the second training field and the third training field are sent in a high efficiency throughput preamble.

11. The apparatus of claim 7, wherein establishing the first spatial channel stream is based at least in part on a channel state information (CSI) associated with the second computing device.

12. The apparatus of claim 7, wherein the first computing device is an access point operating in multi-user multi-input and multi-output (MU-MIMO) wireless system.

13. A non-transitory computer-readable medium storing computer-executable instructions which, when executed by a processor, cause the processor to perform operations comprising:
receiving a first connection request from a second computing device, and a second connection request from a third computing device;
determining a first training field associated with the first connection request and a second training field associated with the second request, wherein the first training field includes a first control channel (CCH) field and the second training field includes a second CCH field;
sending the first training field to the second computing device based at least in part on the first connection request and sending in parallel, the second training field to the third computing device based at least in part on the second connection request; and
establishing a first spatial channel stream with the second computing device based at least in part on the first training field and a second spatial channel stream with the third computing device based at least in part on the second training field.

14. The non-transitory computer-readable medium of claim 13, wherein the first CCH field and the second CCH are sent on odd subcarriers and the first training field and the second training field are sent on even subcarriers.

15. The non-transitory computer-readable medium of claim 13, further comprising:
receiving a third connection request from the second computing device;
determining a third training field associated with the third connection request;
sending the third training field in sequence with the first training field to the second computing device; and
establishing a third spatial channel stream with the second computing device.

16. The non-transitory computer-readable medium of claim 15, wherein the first training field, the second training field and the third training field are sent in a high efficiency throughput preamble.

17. The non-transitory computer-readable medium of claim 13, wherein establishing the first spatial channel stream is based at least in part on a channel state information (CSI) associated with the second computing device.

18. The non-transitory computer-readable medium of claim 13, wherein the first computing device is an access point operating in multi-user multi-input and multi-output (MU-MIMO) wireless system.

* * * * *